F. RETTERER.
AUTOMOBILE CHOCK.
APPLICATION FILED DEC. 24, 1919.

1,353,541.

Patented Sept. 21, 1920.

Inventor
Fred Retterer

UNITED STATES PATENT OFFICE.

FRED RETTERER, OF HARPSTER, OHIO.

AUTOMOBILE-CHOCK.

1,353,541.  Specification of Letters Patent.  Patented Sept. 21, 1920.

Application filed December 24, 1919. Serial No. 347,174.

*To all whom it may concern:*

Be it known that I, FRED RETTERER, a citizen of the United States, residing at Harpster, in the county of Wyandot, State of Ohio, have invented certain new and useful Improvements in Automobile-Chocks; and I do hereby declare the following to be a full, clear, and exact description of the invention, such as will enable others skilled in the art to which it appertains to make and use the same.

This invention relates to locks and latches, and more especially to shackles; and the primary object of the same is to produce a chock which may be applied to an automobile wheel and locked in place to prevent the unauthorized use of the machine in the absence of the owner. While the invention is so designed and described, however, it is not limited to such use because it is capable of being employed for a number of other purposes, especially where the shackle is to be fastened rather closely around articles which may be of different sizes.

One feature of the invention is the means for varying the amplitude of the shackle longitudinally so that it may be successfully applied to tires and fellies of different sizes.

Another feature is the means for permitting the insertion of the cross bar from the outside of the wheel so as to avoid the scratching of the finish on the spokes.

Another feature is the means for housing the padlock so that it does not touch the wheel and the lock itself is protected from malicious interference.

Details of the preferred construction are set forth below and shown in the drawings wherein.

Figure 1:
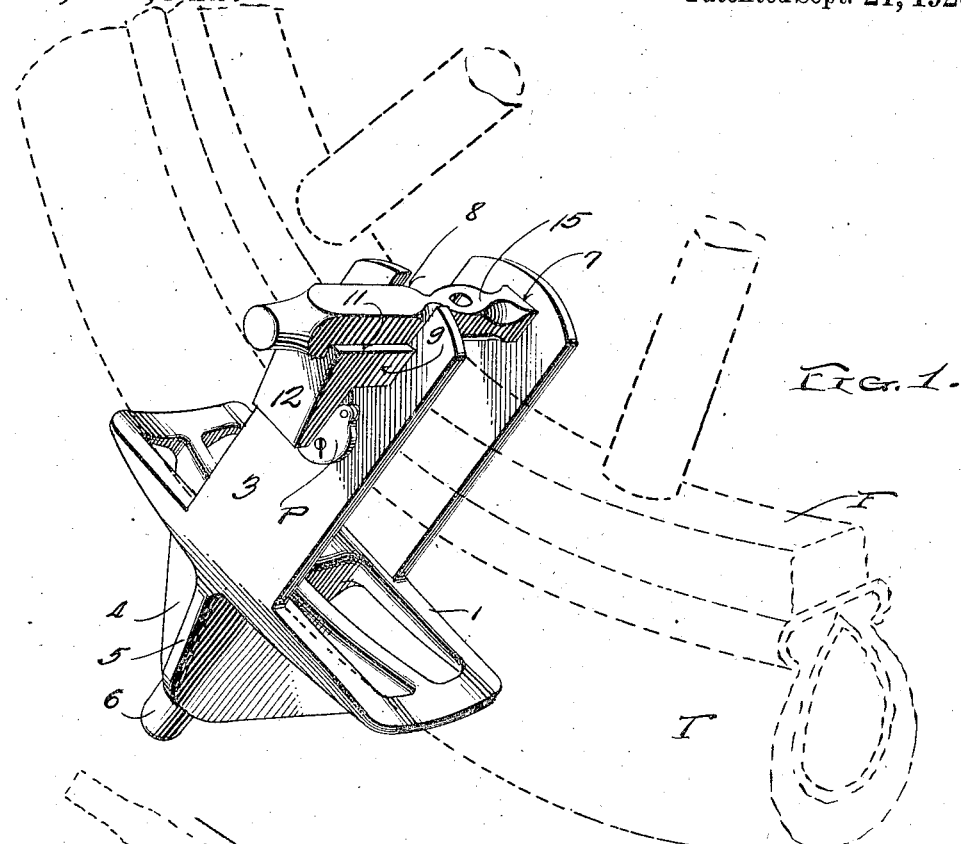
Figure 1 is a perspective view of the lower portion of an automobile wheel with this chock applied.

In the drawings the letter T designates the ordinary pneumatic tire secured in any suitable manner around the felly F, and P designates a padlock having a hooked bail B.

Figure 2:
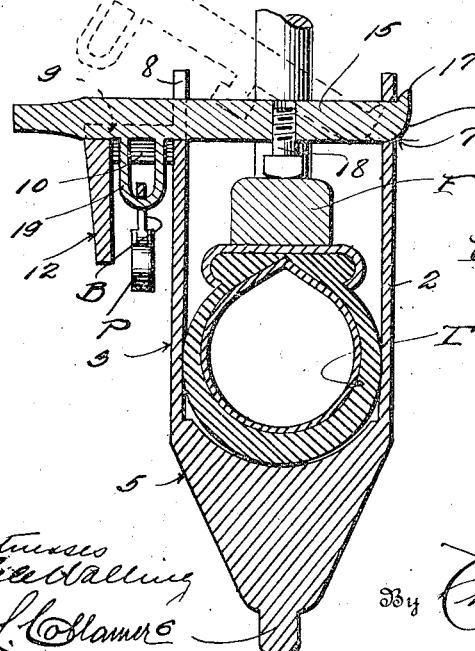
Fig. 2 is an enlarged section through the tire and felly of the wheel and the center of the body and arms of the chock, showing the bar in full lines in its active position and in dotted lines as being inserted.

The invention as herein used is a chock capable of application to the tire and felly of any wheel at a time when the auto comes to rest and the owner is about to leave. This chock is in the form of a U-shaped clip or shackle whose body or bend 1 is dished on its inner side to conform with the curvature of the tread of the tire and may be of skeleton formation as seen in Fig. 1, and whose arms 2 and 3 project in parallelism from said body like the arms of an ordinary clip bolt or U-shaped shackle. On its outer side the bend is considerably enlarged, preferably by casting it with webs 4 and 5 standing in planes parallel with and at right angles to those occupied by the arms, the webs preferably being triangular and being continued at their smaller ends in a considerable spur 6, which, if the wheel were turned, would strike the pavement or road so far beyond the tread of the tire as to chock the wheel and either prevent its rotation entirely or produce such an irregular movement thereof as would retard the progress of the machine and attract attention of the passerby. This element of the invention can be a rough casting, and the arms will be spaced a sufficient distance to pass astride tires of substantially any size (excepting possibly the very largest) so that the chock is applicable to any wheel. What will be the inner arm 2 is provided near its end with an aperture in the shape of a square hole 7, and what will be the outer arm is provided in its extremity with an angular notch 8 opposite said hole. On the outside of this arm is formed or secured a lip 9 longitudinally slotted as at 10 and preferably having upstanding side flanges 11, these alining with the sides of the notch while the outer face of the lip alines with the bottom of the notch. The outer end of the lip is turned down into a guard 12 standing some distance from the outer face of the arm 3 and effectively covering the point where the hasp of the padlock engages the staple yet to be described—in fact this guard may be large enough to cover the whole of the hasp, and even the entire face of the padlock if the latter be of that type whose key is inserted into its lower end. It will be understood that I am speaking of the position of parts about as they stand in Fig. 1. The ordinary clip is closed by a plate across its arms. The mouth of the shackle in this case is closed by a bar 15 which may well be substantially square in cross section with its corners beveled off or rounded where they might contact with the spokes. One end of this bar has a hook 17 on its upper side and is rounded as at 16 on its under side so that it may be easily engaged with the hole 7 when moved in the direction indicated by the arrow in Fig. 2. The bar is of such length that when so hooked into the hole its body may be moved into the notch wherein it cannot turn, and its other end brought down onto the lip 9, and at this point the bar carries an eye or staple 19 which is of sufficient length to pass through the slot 10 and project below the lip so as to receive the padlock. When the latter is snapped onto the bend of the staple, it hangs therefrom behind and is covered by the guard 12 as seen in Fig. 1, and thereby it is protected from malicious interference and to an extent also from the weather. The chock is now locked onto the wheel, and the automobile is therefore unfit for use until the owner returns and removes the chock, carrying it with his machine for subsequent use.

A highly important feature of this invention is the means for adapting it to larger and smaller rims, so that the device may be manufactured in one size and adapted to wheels of a variety of sizes, save perhaps those which are very large. It has been stated that the arms 2 and 3 are spaced so that they will pass astride a rather large tire T. If so they will of course pass astride the felly F. The hole 7 and notch 8 are so disposed that the bar 15 may be passed between the spokes and across the inner side of a felly, and the distance between this bar and the bend of the shackle is such as to inclose a rim whose tire and felly have a considerable aggregate radial thickness. Therefore, if the chock is to be applied to a smaller wheel, some means must be present for bringing the active side of the bar at this time substantially into contact with the inner face of the felly. This adjustment is effected by means of an element or stud adjustably mounted within the bar 15, and as herein shown said stud is a set screw 18 threaded into the bar from its inside so that the head of the set screw faces into the shackle, and obviously the set screw can be adjusted to move the head toward the bend of the shackle and therefore to vary the amplitude of the chock at right angles to the length of its bar, to fit the chock to the wheel. The adjustment of this stud or set screw will be made at the time the device is sold to the user, when either the salesman or the purchaser will set the stud properly as will be clear. Without this detail the chock would be a shackle locked loosely around the rim and generally oversize because it is purposely made large enough to fit large sized rims, and the result would be that in time the paint on the rim and spokes would become scarred. When this detail is employed, the shackle may be adjusted to fit the rim closely on a line radial to the wheel, and its looseness transversely will be less important because the dishing of the bend 1 on its inner face will center the chock on the tire. The adjustment in the amplitude of the shackle may be extremely important in other uses to which the device can be put.

While I have described a padlock P for locking the bar in place, it is obvious that other forms of locks may be employed, and the lock might be attached to or constitute a part of the shackle without departing from the spirit of the invention.

What is claimed as new is:

1. In a chock for auto wheels, the combination with a U-shaped shackle having a notch in one arm, and a slotted lip outstanding from the arm below the notch; of a bar, means for connecting it with the other arm, and a staple in the bar adapted to pass through said slot when the bar is so connected and is disposed across the felly against said lip.

2. In a chock for auto wheels, the combination with a U-shaped shackle having an aperture in one arm, and a lip on its other arm provided with a slot; of a bar having at one end a hook adapted to engage said aperture, and a staple in the bar near its other end adapted to pass through said slot and project beyond the lip and receive a padlock.

3. In a chock for auto wheels, the combination with a shackle having an aperture in one arm, a lip on its other arm provided with a slot, and a guard on the lip; of a bar having one end adapted to engage said aperture, and a staple in the bar near its other end adapted to pass through said slot and project beyond the lip and receive a padlock, the latter underlying said guard.

4. In a chock for auto wheels, the combination with a U-shaped shackle having an aperture in one arm, and a lip on its other arm provided with a slot; of a bar having a hook adapted to engage said aperture, a staple in the bar adapted to pass through said slot and project beyond the lip and receive a padlock, and a guard on the lip overlying the padlock.

5. In a chock for auto wheels, the combination with a shackle having an aperture in one arm, and a lip on its other arm provided with upstanding side flanges and a slot between them; of a bar adapted to engage said aperture and to lie on the lip between its flanges, a staple in the bar adapted to pass through said slot and receive a padlock, and a guard on the lip overlying the padlock.

In testimony whereof, I affix my signature, in the presence of two witnesses.

FRED RETTERER.

Witnesses:
L. A. Kennedy,
C. E. Pisel.